May 11, 1937.  H. A. FINKE  2,080,203

REVERSING VALVE GEAR

Filed July 29, 1935  4 Sheets-Sheet 1

Inventor:
HERMAN A. FINKE

By
Attorney

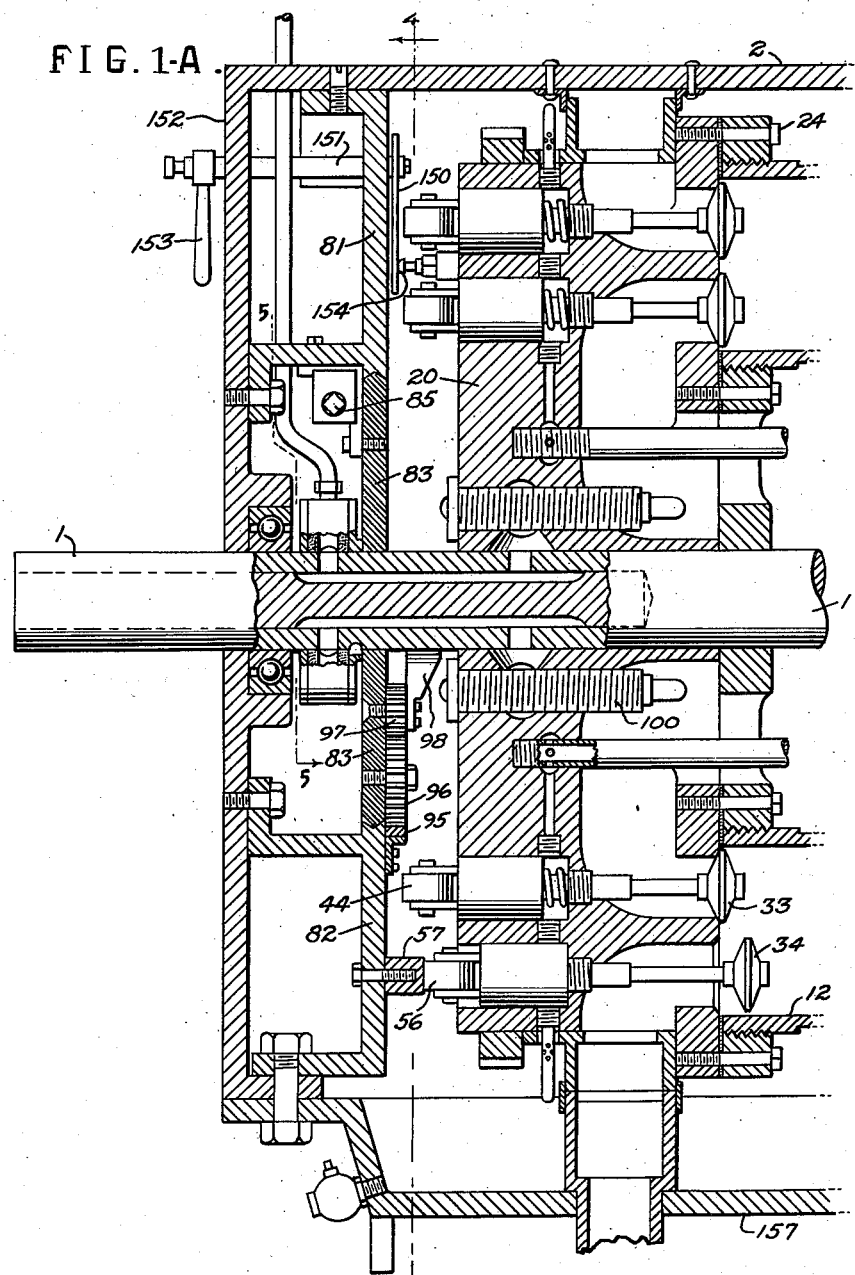

May 11, 1937.  H. A. FINKE  2,080,203
REVERSING VALVE GEAR
Filed July 29, 1935  4 Sheets-Sheet 3

Inventor:
HERMAN A. FINKE

Attorney

Inventor:
HERMAN A. FINKE

Patented May 11, 1937

2,080,203

UNITED STATES PATENT OFFICE 2,080,203

REVERSING VALVE GEAR

Herman A. Finke, St. Louis, Mo.

Application July 29, 1935, Serial No. 33,778

9 Claims. (Cl. 123—41)

This invention relates to reversing valve gear for rotary engines and has for its object to provide a construction simple in operating parts and more efficient in use than those heretofore proposed.

With these and other objects in view the invention resides in the novel details of construction and combinations of parts as will be disclosed more fully hereinafter and particularly pointed out in the claims.

Referring to the accompanying drawings forming a part of this specification and in which like numerals designate like parts in all the views,—

Fig. 1a is a similar view of the other end of the engine;

Figure 1:
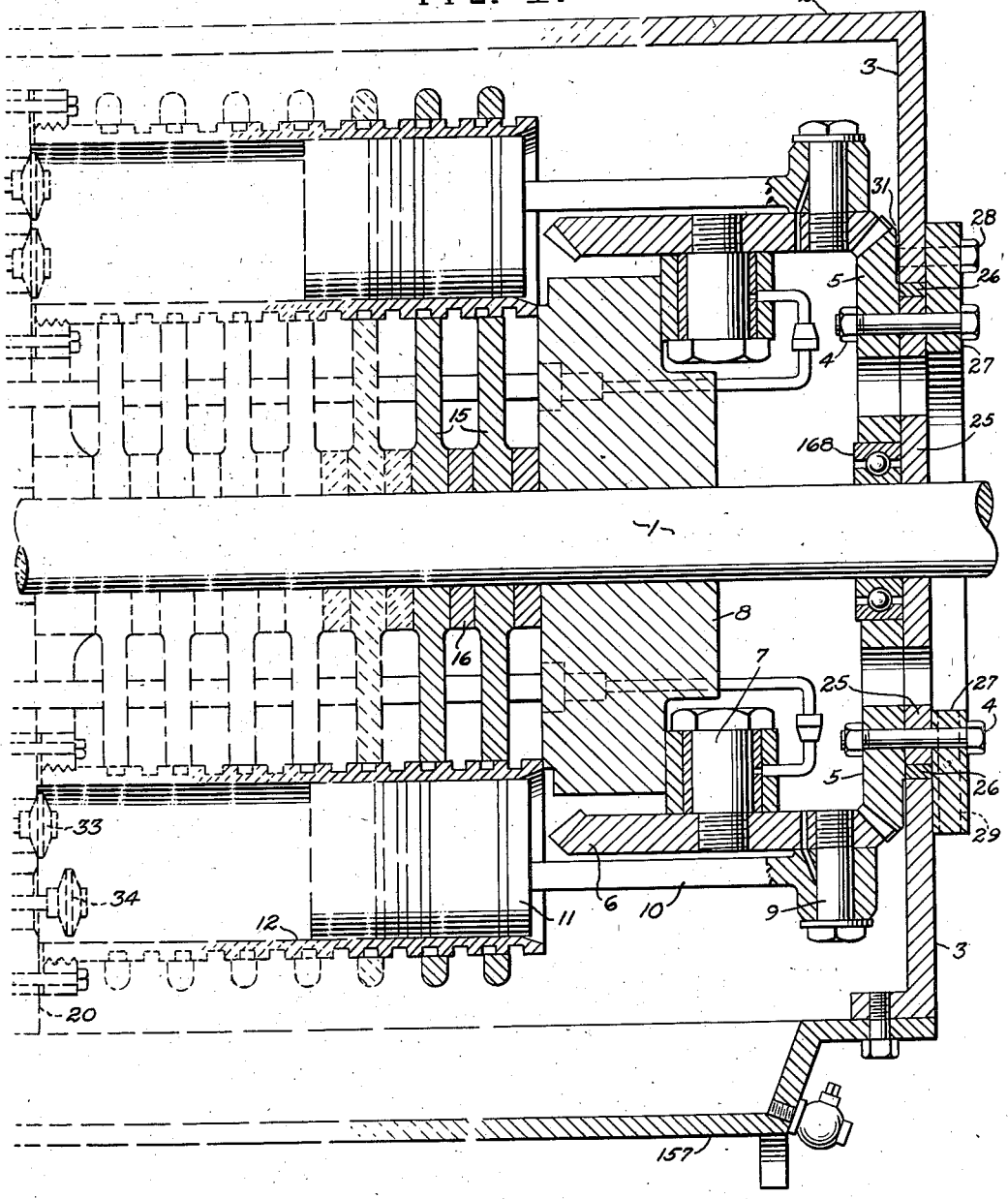
Fig. 1 is a vertical sectional view of one end of a rotary engine taken through the main shaft thereof.

This invention constitutes an improvement in the construction disclosed in my U. S. Letters Patent 1,807,087 granted May 26, 1931 entitled Internal combustion engine, and more particularly is directed to a means for accomplishing the reverse rotation of said engine. Therefore in the following description as well as in the drawings there are disclosed corresponding associated parts shown in said patent and to which largely there have been applied the same reference numerals so that in conjunction with said patent this invention may be clearly understood.

Briefly, the engine to which this invention is applied is a 4-cylinder rotary engine driven by the internal combustion of a gaseous fuel, said engine consisting of a plurality of cylinders such as 12 rigidly suspended in frames such as 15 having between the latter spacing plates 16 all rigidly attached to and disposed about a main shaft 1 and secured as by the bolts 24 to a cylinder head 20 having therein for each cylinder respectively an intake valve 33 and an exhaust valve 34. Each cylinder of the engine is provided with a piston such as 11 connected as by a pitman 10 to a crank pin 9 carried by a bevelled gear pinion 6 freely rotatable upon a stud 7 carried by a casting 8 forming one end of the cylinder frame assembly. Each gear pinion is enmeshed with a single and common ring gear 5 rigidly secured by a plurality of bolts 4 to the end plate 3 of the stationary engine casing 2, the latter having depending therefrom the oil sump 157 provided with a suitable drain.

At the other end, the casing is provided with a plurality of plates, one plate 82 stationary and carrying thereon a cam 57 for actuating the exhaust valves; another plate 81 stationary and carrying two similarly formed electric contact members such as 150 each shiftable into circuit closing position in accordance with the directional rotation of the engine; and a third plate 83 carrying a shiftable member 98 for actuating the carburetors such as 100 as well as carrying two diametrically disposed arcuate cams 45 and 90 for actuating the intake valves, said plate 83 shiftable to bring said member 98 and either of the cams 45 or 90 into operative position in accordance with the directional rotation of the engine.

Figure 4:
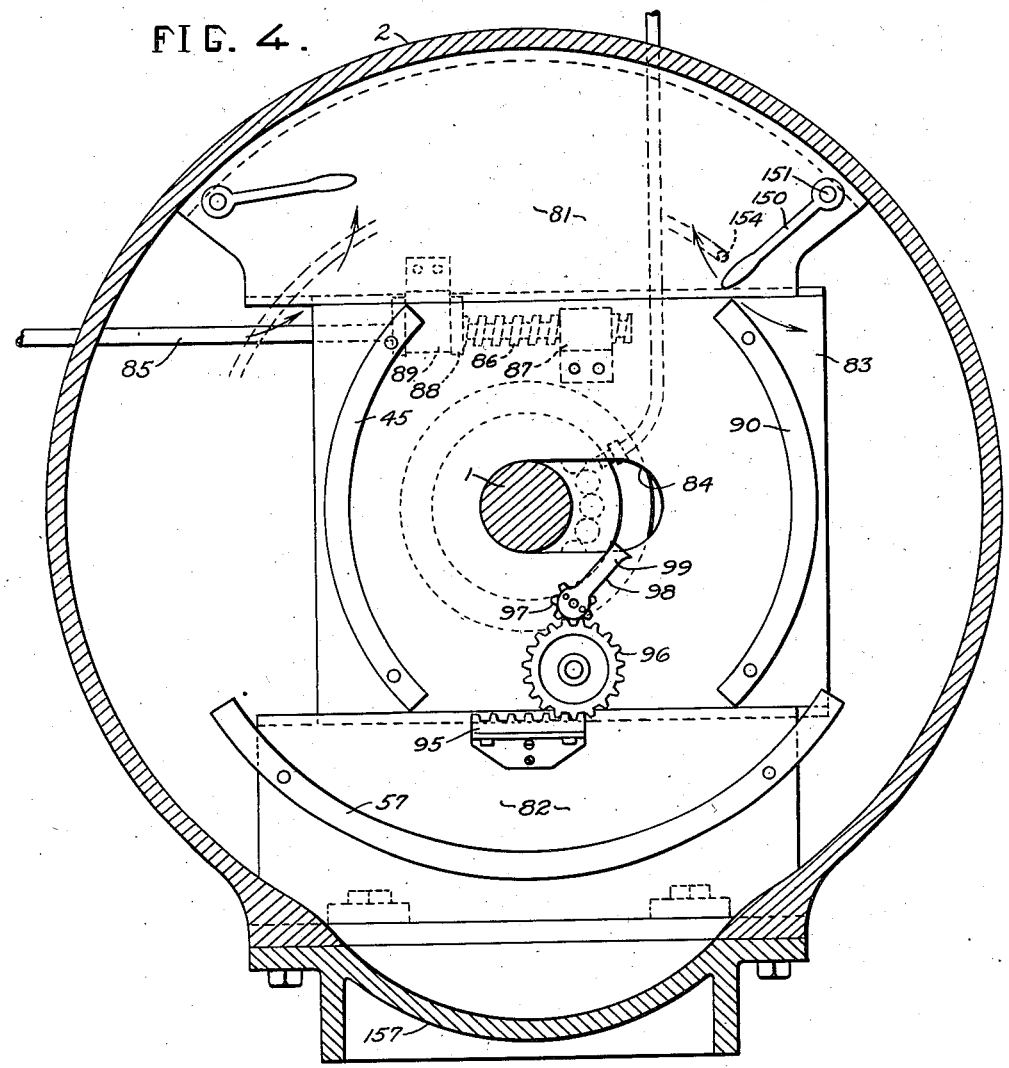
Fig. 4 is a transverse sectional view taken as on the line 4—4 of Fig. 1a and looking in the direction of the arrow.
Figure 5:
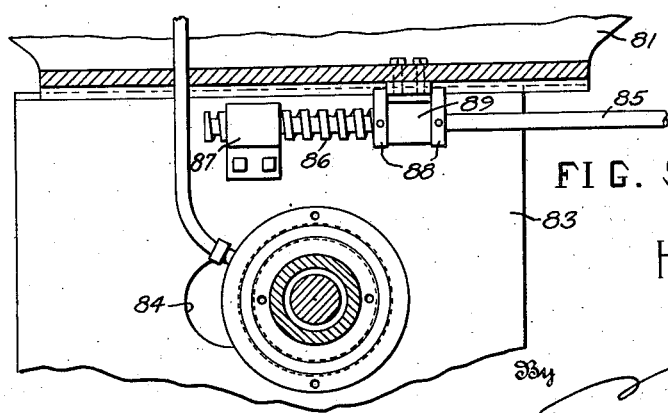
Fig. 5 is a transverse sectional view in detail taken as on the line 5—5 of Fig. 1a and looking in the direction of the arrow.

With particular reference to Figs. 1a and 5 it will be seen that the lower edge of the plate 81 and the upper edge of the plate 83 have slidable interengagement, as do also the lower edge of plate 83 and the upper edge of the plate 82 whereby the plate 83 is always maintained within the common plane of the two stationary plates. The plate 83 has a central elongated slot 84 to accommodate the main shaft 1 and in Fig. 4 said plate is shown in its extreme right hand position at which time the arcuate cam 45 is disposed a radial distance from the main shaft 1 equal to the distance of the axis of the stem of each intake valve from said shaft, said cam therefore being in the arcuate path of the roller such as 44 mounted on the end of each intake valve stem, for operating said valves. In this position of the plate 83, the other similarly formed cam 90 is in inoperative position, but when said plate is moved to assume its full left hand position with respect to the main shaft as seen in Fig. 4, the cam 90 will be moved into operative position and engage the roller 44 of each intake valve stem, and the cam 45 will be moved into inoperative position.

In other words either the cam 45 or the cam 90 will actuate the intake valve stems, in accordance with the operative position of the cam as governed by the position of the shiftable plate 83. Thus, when the engine is rotating in one direction the cam 45 will operate each intake valve but, when it is desired to rotate the engine reversely, the plate 83 will be shifted to cause said valves to be operated by the other diametrically opposed cam 90. The cam 57, being mounted upon a stationary plate, never moves and consequently is always in the arcuate path of the roller such as 56 mounted on an end of each exhaust valve.

The shifting of the plate 83 may be accomplished in any suitable manner such as by a shaft 85 having on one end thereof a worm 86 adapted to operate through a companion threaded member 87 rigidly carried by said plate, axial movement of the shaft being prevented by collars 88 working against the sides of a guide bracket 89 carried by the upper stationary plate 81, see Fig. 5. The shaft 85 may be rotated in any manner either manually or otherwise.

The means for controlling the amount of fuel admitted to the intake manifold of the engine comprises a rack 95 rigidly mounted on the lower stationary plate 82, a gear 96 rotatably supported on the shiftable plate 83 and enmeshed with said rack, and a gear pinion 97 also mounted on said plate 83 and enmeshed with the gear 96, the pinion 97 having an arm 98 extending therefrom provided with a cam surface 99 at its outer end adapted to actuate suitable mechanism to force a quantity of fuel from the carburetor 100 into the intake manifold, there being one carburetor for each cylinder of the engine, all carburetors being disposed the same radial distance from the center of the main shaft for actuation by the single cam arm 98. Since it is desirable to admit the fuel at a definite time with relation to the actuation of the intake valves, the gear ratio of the parts 95, 96 and 97 is made such that the cam arm 98 will be in the position shown in Fig. 4 when the cam 45 is in position to actuate the intake valves, but when the other cam 90 is operating said valves (as brought about by a shift of the plate 83) the cam arm 98 will have been moved clockwise through approximately 270° to assume a similar position on the other side of the center line between the gears 96 and 97, ready to actuate the carburetors during the reverse rotation of the engine.

The upper stationary plate 81 carries two similarly formed and positioned electrical contact members, each similarly but preferably independently operated and therefore only one will be particularly described. This member is identified by the numeral 150 and is mounted on the end of a shaft 151 supported in said plate and having its other end supported in the end wall 152 of the casing 2 surrounding the engine, any suitable device such as the handle or lever arm 153 being provided on said shaft for turning the same to change the position of said member from that of operativeness as shown at the right side of said plate to that of inoperativeness as shown at the left side thereof, see Fig. 4. The member 150 is operatively so positioned that, as the engine revolves, a companion electrical contact member 154 mounted upon the cylinder head 20 will strike or swipe over the same and close the electric circuit to a spark plug for each cylinder (the circuit and spark plug not illustrated herein but readily understood), there being a companion contact member 154 for each spark plug. When the engine is desired to rotate reversely, obviously a different timing of the spark is necessary with reference to the firing of the gaseous charge of fuel admitted to the cylinders, and consequently upon such reversal of rotation the other electrical contact member 150 is turned into operative position and the first described member is turned into inoperative position, these two members having 90° relative location on the plate 81 with respect to the cycle of engine rotation, as shown.

Therefore it will be understood that this engine is similar in practically all respects to the engine disclosed in said patent wherefore upon combustion of the fuel in each cylinder the piston therein will drive its gear pinion 6 which, through its enmeshment with the stationary ring gear 5, will be caused to "walk" or travel bodily around the ring gear with resultant rotation of all of the cylinders and the main shaft as a unit around the axis of the main shaft of the engine which passes through said ring gear, a bearing such as 168 being provided for supporting the shaft at this end of the casing.

According to this invention the end plate 3 of the casing has a circular central section thereof, indicated at 25, cut out or divided from the main body portion of said end plate, which section is coaxial with the main shaft 1 and reinserted in the plane of the said end plate, the space between said section and the edge formed by cutting the same from the main body portion being filled with an annular antifriction ring 26. Covering this antifriction ring and the outer peripheral portion of the central section 25, there is a flat ring plate 27 secured to the main body portion of the end plate 3 by a plurality of bolts such as 28 of a length only sufficient to pass through said ring plate and have threaded engagement in said end plate, thereby differing from the relatively long bolts 4 which pass through the ring gear 5, the central section 25 of the end plate, and the ring plate 27. This antifriction ring is also covered within the casing by the ring gear. Thus it will be understood that said ring plate is adapted to be attached rigidly at all times to said ring gear and said central section of the end plate, but is adapted to have its position altered or shifted with respect to the main body portion of the end plate 3 of the casing.

Figure 2:
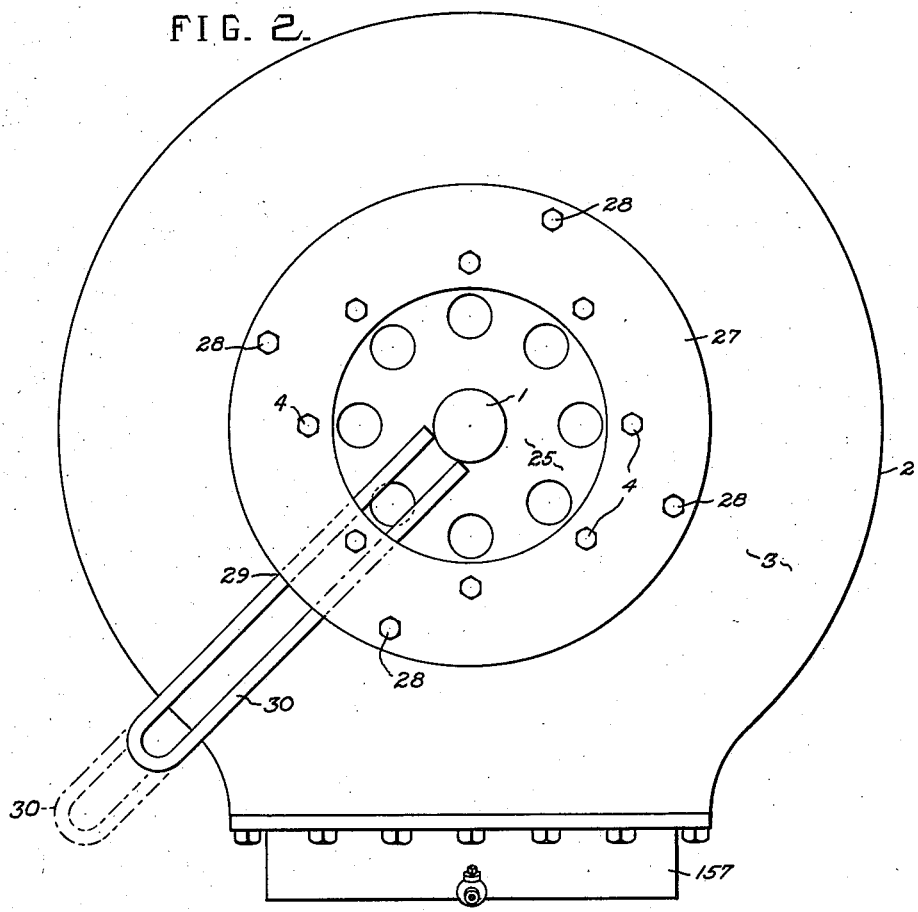
Fig. 2 is an end elevational view of a rotary engine to which this invention has been applied.
Figure 3:
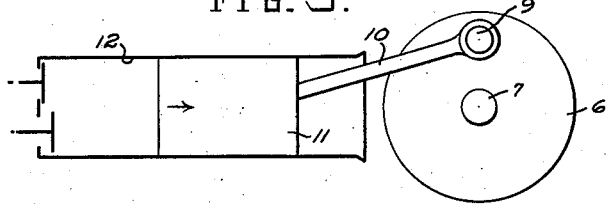
Fig. 3 is a diagrammatic view showing a cylinder with associated piston and gear pinion attached thereto.
Figure 3:
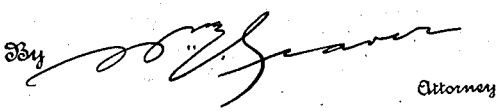

The ring plate is provided with two substantially parallel radial bores as at 29 to slidingly receive therein the branches of a substantially U-shaped handle 30 constituting a lever by which the ring plate may be shifted, Fig. 2 showing such handle in full lines in its retracted or inner position, and showing in dotted lines its extended position by which latter a greater leverage may be obtained for shifting the position of the ring plate. A small clearance indicated at 31 is provided between the abutting surfaces of the ring gear and the surface of the main body portion of the end plate of the casing to eliminate friction therebetween when the ring plate is shifted.

From the foregoing description it will therefore be understood that since the ring plate is rigidly secured at all times to the ring gear, a shift of said ring plate will produce a corresponding shift of said ring gear, and in order to shift the ring plate the four short bolts 28 are removed, the handle 30 extended for greater leverage and then moved through 90° to shift the ring plate to a reregistration of bolt holes and then the bolts 28 reinserted. When the ring is thus shifted, the pinions 6 will be rotated one-half turn, causing the pistons 11 to be moved from one end of the cylinder to the other. This will necessarily occur unless the cylinders and accompanying parts are bodily rotated, because the inertia of the pistons and pinions is less than the inertia (resistance to motion) of the bodily rotating cylinders and accompanying parts. Therefore the shiftable plate 83 at the other end of the casing is adjusted to interchange the effective positions of the intake valve actuating cams 45 and 90 as well as the carburetor actuating member 98, and the electric contact members such as 150 are reversely positioned, all to bring about a correct sequence of cyclic operation but in a reverse direction. It is contemplated that other means than the bolts 28 may be employed for locking the ring plate 27 in shifted position particularly in order to enable a simultaneous and/or inter-connected movement of the ring plate and the aforesaid other shiftable members, as by levers, gears, chain and sprockets etc. including remote control thereof.

It is obvious that those skilled in the art may vary the details of construction as well as arrangements of parts without departing from the spirit of the invention, and it is therefore not desired to be limited to the above disclosure except as may be required by the claims.

What is claimed is,—

1. In a rotary engine wherein the cylinders are mounted for rotation with the engine shaft and each cylinder is provided with a piston and connections for rotating a pinion, the combination of a stationary casing disposed about a portion of the engine said casing provided with a wall having a movable section; a ring gear secured to the movable section of said wall and enmeshed with each pinion; and means disposed externally of the casing and secured to said movable section for shifting said ring gear and pistons to bring about a reversal of cyclic operations of the latter.

2. In a rotary engine wherein the cylinders are mounted for rotation with the engine shaft and each cylinder is provided with a piston and connections for rotating a pinion, the combination of a stationary casing disposed about a portion of the engine said casing provided with a wall having a movable section; a ring gear secured to the movable section of said wall and enmeshed with each pinion; and means disposed externally of the casing and spanning the joint between said movable section and the main body portion of said wall for shifting said ring gear and pistons to bring about a reversal of cyclic operations of the latter.

3. In a rotary engine wherein the cylinders are mounted for rotation with the engine shaft and each cylinder is provided with a piston and connections for rotating a pinion, the combination of a stationary casing disposed about a portion of the engine said casing provided with a wall having a movable section; a ring gear secured to the movable section of said wall and enmeshed with each pinion; means disposed externally of the casing for shifting said ring gear and pistons to bring about a reversal of cyclic operations of the latter; and means to lock said shifting means to the main body portion of said wall.

4. In a rotary engine wherein the cylinders are mounted for rotation with the engine shaft and each cylinder is provided with a piston and connections for rotating a pinion, the combination of a stationary casing disposed about a portion of the engine said casing provided with a wall having a movable section; a ring gear secured to the movable section of said wall and enmeshed with each pinion; and a plate slidably engaging the outer surface of said wall and overlying said section, said plate provided with operating means for shifting said ring gear and pistons to bring about a reversal of cyclic operations of the latter.

5. In a rotary engine wherein the cylinders are mounted for rotation with the engine shaft and each cylinder is provided with a piston and connections for rotating a pinion, the combination of a stationary casing disposed about a portion of the engine said casing provided with a wall having a movable section; a ring gear secured to one side of the movable section of said wall and enmeshed with each pinion; and means disposed externally of the casing and secured to the other side of said movable section for shifting said ring gear and pistons to bring about a reversal of cyclic operations of the latter.

6. In a rotary engine wherein the cylinders are mounted for rotation with the engine shaft and each cylinder is provided with a piston and connections for rotating a pinion, the combination of a casing disposed about a portion of the engine said casing provided with a wall cut to provide a main body portion and a circular section, the main body portion stationary and the circular section refitted in the plane of the wall with an antifriction ring interposed between the cut edges of said portion and said section whereby to permit movement of said section; a ring gear secured to one side of said section and enmeshed with each pinion; means disposed externally of the casing and secured in surface contact with the other side of said section and spanning the adjacent wall areas of said portion and said section, said means for shifting said ring gear and pistons to bring about a reversal of cyclic operations of the latter; and means to lock said shifting means to the main body portion of said wall.

7. In an internal combustion engine provided with a shaft the combination of a plurality of cylinders constituting a unit assembly mounted for rotation with said shaft; a head for said cylinders; valves for each cylinder carried by said head and operable in predetermined sequence; and means to change the sequence of valve operation, said means including the shifting of the cylinder unit assembly.

8. In an internal combustion engine provided with a shaft the combination of a plurality of cylinders constituting a unit assembly mounted for rotation with said shaft; a head for said cylinders; valves for each cylinder carried by said head and operable in predetermined sequence; and means to change the sequence of valve operation, said means including a slidable member controlling valve actuation and a rotatable member for shifting the cylinder unit assembly.

9. In an internal combustion engine provided with a shaft the combination of a plurality of cylinders constituting a unit assembly mounted for rotation with said shaft; a head for said cylinders; valves for each cylinder carried by said head and operable in predetermined sequence; and means to change the sequence of valve operation, said means including a slidable member at one end of the engine controlling the valve actuation and a rotatable member at the opposite end of the engine for shifting the cylinder unit assembly.

HERMAN A. FINKE.